US011180166B2

(12) United States Patent
Goto et al.

(10) Patent No.: US 11,180,166 B2
(45) Date of Patent: Nov. 23, 2021

(54) VEHICLE CONTROL DEVICE

(71) Applicant: HONDA MOTOR CO., LTD., Tokyo (JP)

(72) Inventors: Takeru Goto, Wako (JP); Hideki Matsunaga, Wako (JP); Masaaki Nagashima, Wako (JP); Yoshimitsu Murahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/754,956

(22) PCT Filed: Oct. 11, 2017

(86) PCT No.: PCT/JP2017/036852
§ 371 (c)(1),
(2) Date: Apr. 9, 2020

(87) PCT Pub. No.: WO2019/073554
PCT Pub. Date: Apr. 18, 2019

(65) Prior Publication Data
US 2020/0298884 A1 Sep. 24, 2020

(51) Int. Cl.
B60W 60/00 (2020.01)
B60W 30/095 (2012.01)
(Continued)

(52) U.S. Cl.
CPC .... B60W 60/0027 (2020.02); B60W 30/0956 (2013.01); B60W 30/18154 (2013.01);
(Continued)

(58) Field of Classification Search
CPC ........ B60W 60/0027; B60W 60/0017; B60W 30/0956; B60W 30/18154;
(Continued)

(56) References Cited

U.S. PATENT DOCUMENTS 6,641,091 B1 * 11/2003 Hilleary .................. B61L 29/08
246/111
9,459,623 B1 * 10/2016 Raghu .................... G01S 13/931
(Continued)

FOREIGN PATENT DOCUMENTS

JP 2000-182027 A 6/2000
JP 2005-165643 A 6/2005
WO 2017/038883 A1 3/2017

OTHER PUBLICATIONS

PCT/ISA/210 from International Application PCT/JP2017/036852 with the English translation thereof.

Primary Examiner — Donald J Wallace
(74) Attorney, Agent, or Firm — Carrier Blackman & Associates, P.C.; Joseph P. Carrier; Jeffrey T. Gordon

(57) ABSTRACT

Provided is a vehicle control device which, when traffic participants are waiting in the vicinity of a railroad crossing for a train to pass, appropriately controls driving of a vehicle about to pass through the railroad crossing. Entry of the vehicle into the railroad crossing is restrained until a waiting time elapses since when the railroad crossing transitioned from a passage blocking state to a passage allowing state, the waiting time being set in accordance with the kind or the number of the traffic participants present in the vicinity of the railroad crossing. When the waiting time has elapsed, the vehicle is caused to enter the railroad crossing and pass (through) the railroad crossing.

4 Claims, 5 Drawing Sheets

(51) Int. Cl.
*B60W 30/18* (2012.01)
*B60W 10/04* (2006.01)
*B60W 10/18* (2012.01)
*B60W 10/20* (2006.01)

(52) U.S. Cl.
CPC ......... *B60W 60/0017* (2020.02); *B60W 10/04* (2013.01); *B60W 10/18* (2013.01); *B60W 10/20* (2013.01); *B60W 2420/403* (2013.01); *B60W 2420/52* (2013.01); *B60W 2552/20* (2020.02); *B60W 2554/4029* (2020.02); *B60W 2554/4041* (2020.02)

(58) Field of Classification Search
CPC ..... B60W 2554/4041; B60W 2552/20; B60W 2554/4029; B60W 10/04; B60W 10/18; B60W 10/20; B60W 2420/403; B60W 2420/52; B60W 2555/60; B60W 30/18159; B60W 2552/50; G08G 1/16
See application file for complete search history.

(56) References Cited

U.S. PATENT DOCUMENTS

| | | | |
|---|---|---|---|
| 2008/0147305 A1* | 6/2008 | Kawamata | B60W 50/0097 701/117 |
| 2014/0232567 A1* | 8/2014 | Hara | G08G 1/163 340/944 |
| 2015/0134180 A1* | 5/2015 | An | G08G 1/005 701/23 |
| 2018/0144201 A1* | 5/2018 | Yoshihira | G08G 1/16 |
| 2019/0017840 A1* | 1/2019 | Okamoto | G08G 1/096855 |
| 2020/0117192 A1* | 4/2020 | Satoh | G08G 1/16 |
| 2020/0255005 A1* | 8/2020 | Matsunaga | B60W 30/16 |
| 2020/0255033 A1* | 8/2020 | Matsunaga | G08G 1/166 |
| 2020/0310420 A1* | 10/2020 | Scorcioni | G08G 1/00 |

* cited by examiner

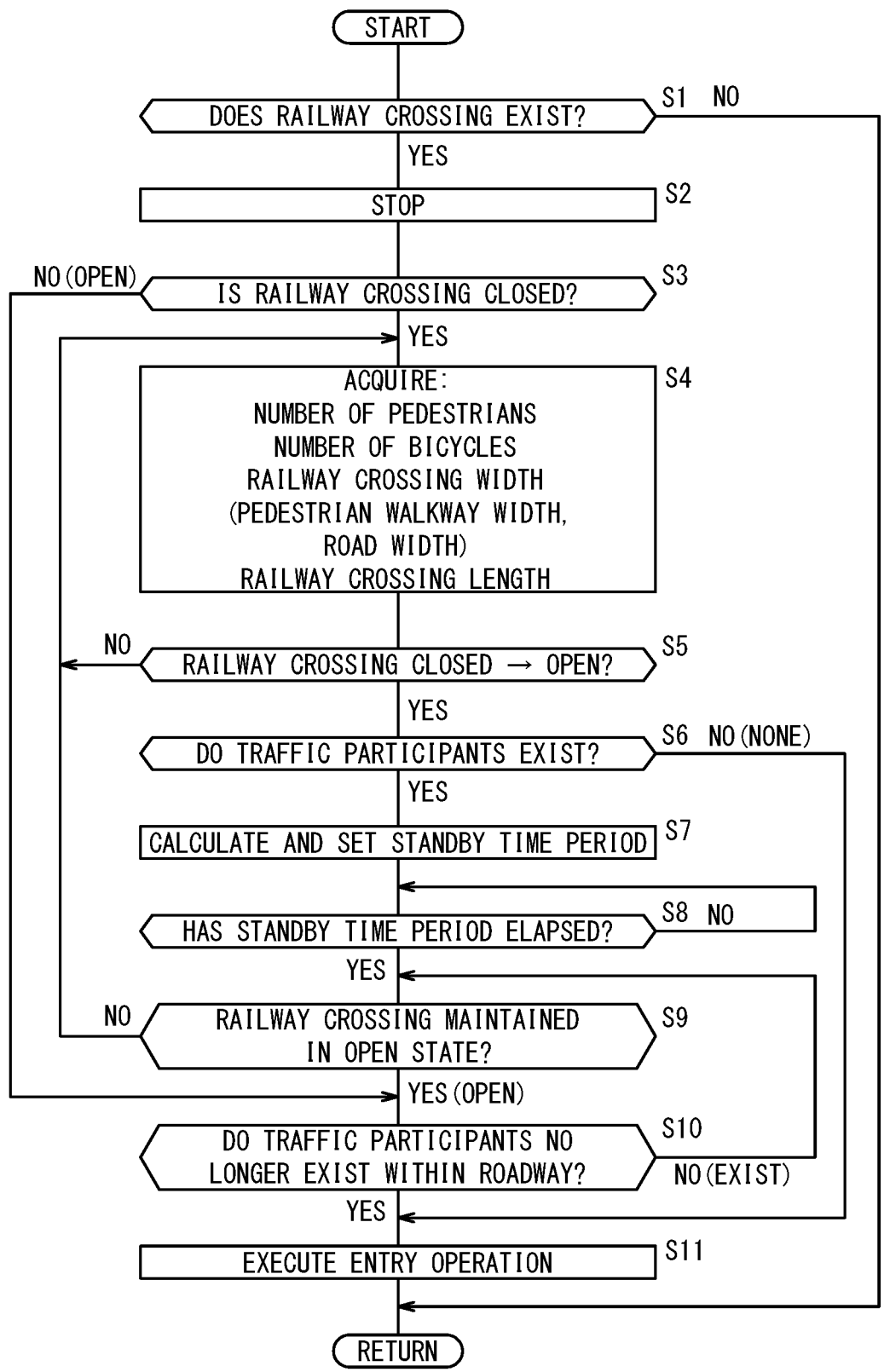

VEHICLE CONTROL DEVICE

TECHNICAL FIELD

The present invention relates to a vehicle control device that controls driving (automated driving or a driving assist) of a vehicle that passes through a railway crossing.

BACKGROUND ART

In Japanese Laid-Open Patent Publication No. 2005-165643 (hereinafter referred to as JP2005-165643A), a driving assist device is disclosed in which driving assistance is provided to a host vehicle, at a location just before a railway crossing where a travel path of the host vehicle and the railway crossing intersect each other.

In such a driving assist device, before entering into the railway crossing, a determination is made as to whether or not a space exists (or occurs) within which the host vehicle is capable of entering and proceeding to the outer side (other side) of the railway crossing, and in the case that such a space exists, the host vehicle is determined to be capable of passing through the railway crossing (see FIG. 7 and paragraphs [0101] and [0103] of JP2005-165643A).

SUMMARY OF INVENTION

However, even assuming a case in which a space exists that enables entry and proceeding to the outer side (other side) of the railway crossing, for example, in the event that a large number of traffic participants such as pedestrians and bicycles or the like are waiting for the railway crossing at the same time that the host vehicle is waiting for the railway crossing, a situation may occur in which such traffic participants intrude into the roadway when the railway crossing is opened.

In JP2005-165643A, there is no disclosure concerning a method of controlling a vehicle in such a case, and room remains for improvement.

The present invention has been devised taking into consideration the aforementioned problem, and has the object of providing a vehicle control device which is capable of appropriately controlling driving (automated driving or a driving assist) of a vehicle that plans to pass through a railway crossing, in the case that traffic participants are waiting to cross in proximity to the railway crossing.

The vehicle control device according to the present invention is a vehicle control device that performs a driving control for a host vehicle, the vehicle control device comprising:

an external environment recognition unit configured to recognize traffic participants and a railway crossing existing in a vicinity of the host vehicle;

a position recognition unit configured to recognize a travel position of the host vehicle;

a vehicle situation determination unit configured to determine whether or not the host vehicle is planning to pass through the railway crossing on a basis of a recognition result of the external environment recognition unit and/or a recognition result of the position recognition unit;

a standby time period setting unit configured to set a standby time period until entry into the railway crossing is started, in accordance with a type or a number of the traffic participants existing in proximity to the railway crossing; and an entry permission determination unit configured to restrain entry of the host vehicle into the railway crossing until the standby time period elapses from a time at which the railway crossing has transitioned from a traffic blocking state to a traffic permissible state, and permit entry of the host vehicle into the railway crossing at a time when the standby time period has elapsed.

According to the present invention, in the case that traffic participants exist in proximity to the railway crossing, until the standby time period, which is set in accordance with the number of the traffic participants, has elapsed from a time at which the railway crossing has transitioned from the traffic blocking state to the traffic permissible state, entry of the host vehicle into the railway crossing is restrained, and at a time when the standby time period has elapsed, the host vehicle is permitted to enter into the railway crossing.

Therefore, in the case that the host vehicle is an automatically driven vehicle, the host vehicle can be allowed to enter into the railway crossing when the standby time period has elapsed, and in the case that the host vehicle is a driving assisted vehicle, a warning is issued when the host vehicle attempts to enter into the railway crossing before the standby time period elapses, and when the standby time period has elapsed, the host vehicle can be prompted to enter into the railway crossing.

According to the present invention, driving (automated driving or a driving assist) of a vehicle that plans to pass through the railway crossing can be appropriately controlled, in the case that traffic participants are waiting to cross in proximity to the railway crossing.

In this case, the standby time period setting unit preferably sets the standby time period to be longer as the number of the traffic participants becomes greater.

By being set in this manner, the standby time period can be set to an appropriate time period in accordance with the number of the traffic participants.

The standby time period setting unit may change the standby time period in accordance with the type of the traffic participants.

By being changed in this manner, the standby time period can be set more appropriately.

Further, the standby time period setting unit preferably sets the standby time period to be longer as a road width inside the railway crossing becomes narrower.

As the width of the road inside the railway crossing becomes narrower, the passage time period required for the traffic participants to pass through the railway crossing interior becomes longer, and therefore, by increasing the standby time period corresponding to the passage time period, an appropriate standby time period can be set.

BRIEF DESCRIPTION OF DRAWINGS

FIG. 5 is a flowchart provided to describe operations of the vehicle control device.

DESCRIPTION OF EMBODIMENTS

Preferred embodiments of a driving control device according to the present invention will be presented and described in detail below with reference to the accompanying drawings. In the following description, a vehicle (driver's own vehicle) which is the subject of the description will be referred to as a host vehicle, whereas vehicles other than the host vehicle will be referred to as other vehicles. Further, although an exemplary description will be made of a left-hand traffic situation for the vehicle, the present invention can similarly be applied to a right-hand traffic situation.

Figure 1:
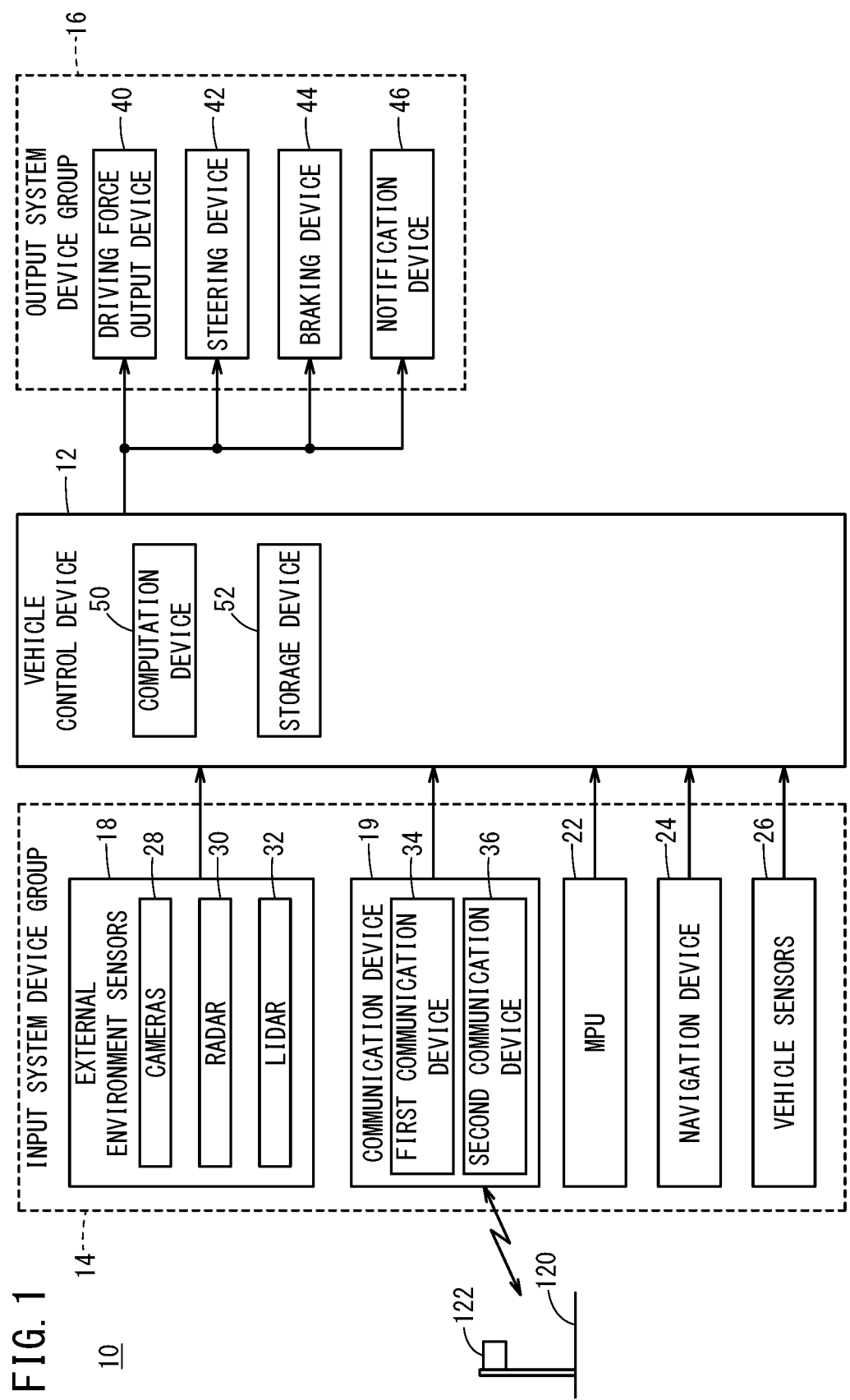
FIG. 1 is a block diagram of a host vehicle equipped with a vehicle control device according to the present embodiment.
Figure 2:
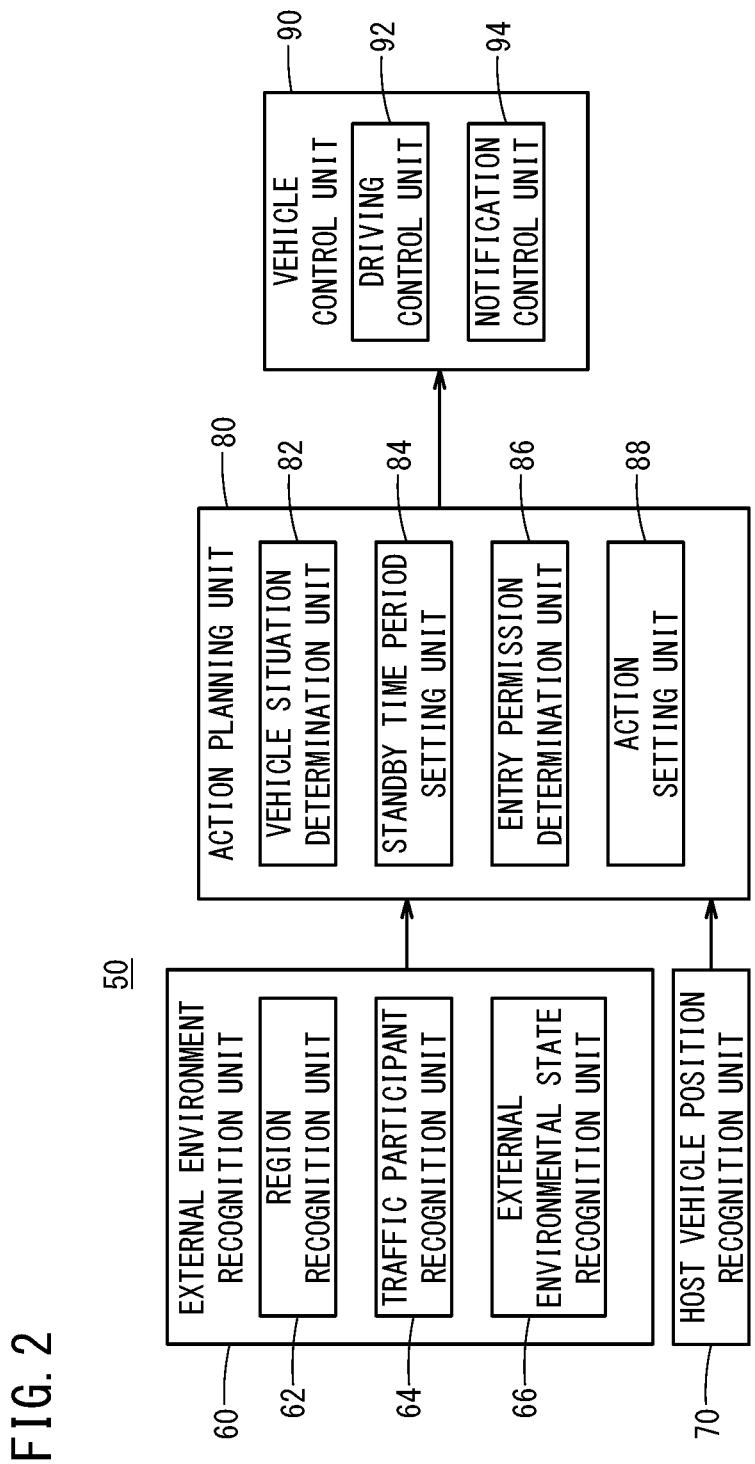
FIG. 2 is a functional block diagram of the vehicle control device.
Figure 3:
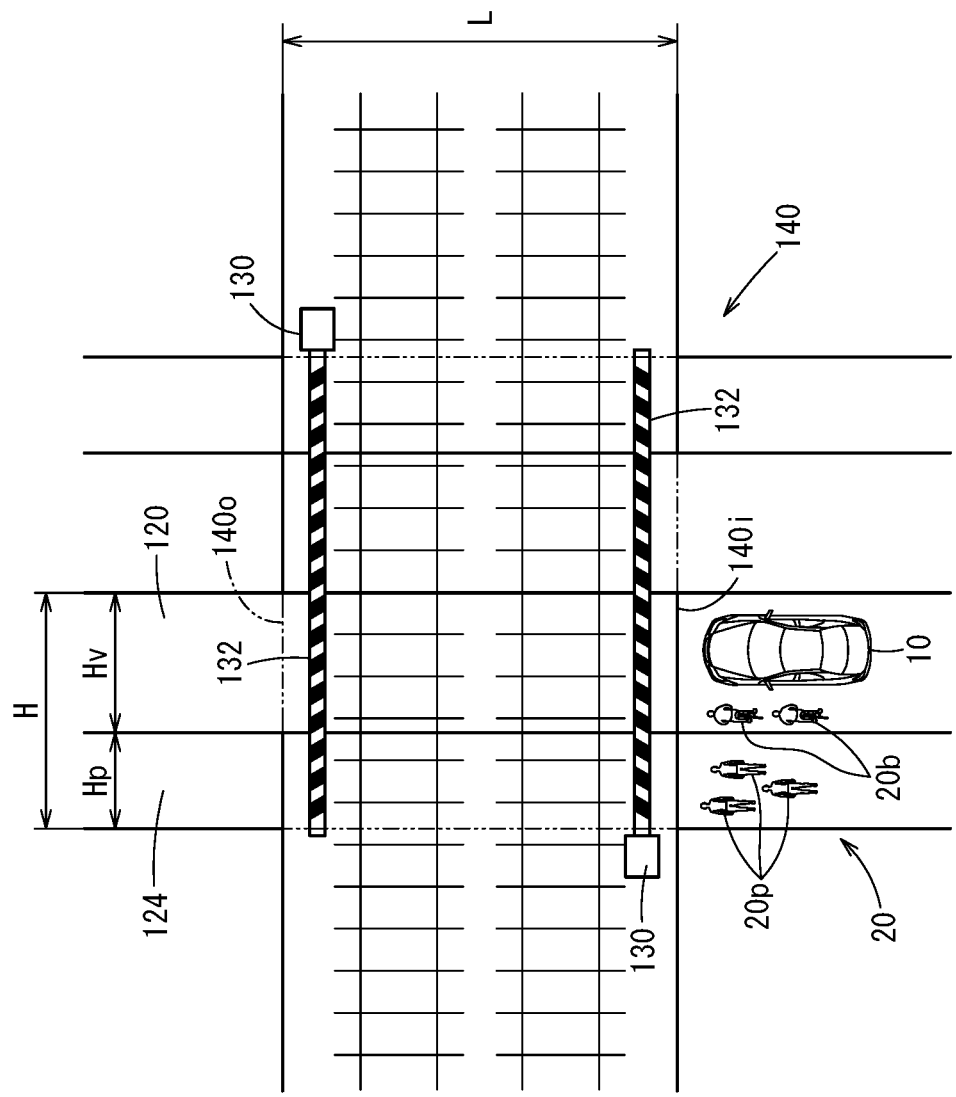
FIG. 3 is a schematic plan view showing a host vehicle or the like that is planning to enter into a railway crossing.

FIG. 1 is a block diagram of a host vehicle 10 equipped with a vehicle control device 12 according to a present embodiment. FIG. 2 is a functional block diagram of the vehicle control device 12. FIG. 3 is a schematic plan view showing the host vehicle 10, and traffic participants 20 such as pedestrians 20p and bicycles 20b or the like, which are planning to enter into a railway crossing 140 when crossing gate rods 132 thereof are opened.

1. Configuration of Host Vehicle 10

As shown in FIG. 1, the host vehicle 10 includes a vehicle control device 12, an input system device group 14 which acquires or stores various information input by the vehicle control device 12, and an output system device group 16 which is operated in response to various instructions output by the vehicle control device 12. The host vehicle 10 is an automatically driven vehicle (including a fully automatically driven vehicle) in which driving operations are performed by the vehicle control device 12, or a driving assisted vehicle in which portions of the driving operations are assisted.

[1.1. Input System Device Group 14]

In the input system device group 14, there are included external environment sensors 18 that detect a state of the surrounding vicinity (external environment) around the host vehicle 10, a communication device 19 which carries out transmission and reception of information to and from various communication devices located externally of the host vehicle 10, an MPU (high precision map) 22 the positional precision of which is less than or equal to centimeter units, a navigation device 24 that generates a travel route to a destination together with measuring a travel position of the host vehicle 10, and vehicle sensors 26 that detect the traveling state of the host vehicle 10.

Among the external environment sensors 18, there are included one or more cameras 28 that capture images of the external environment, and one or more radar devices 30 and one or more LIDAR (Light Detection and Ranging) devices 32 that detect the distance between the host vehicle 10 and other surrounding objects (including the traffic participants 20), as well as the relative speed between the host vehicle 10 and the surrounding objects.

In the communication device 19, there are included a first communication device 34 that performs inter-vehicle communications with communication devices disposed in non-illustrated other vehicles, and a second communication device 36 that performs road-to-vehicle communications with communication devices 122 provided in infrastructure such as a travel path 120 and the like.

The navigation device 24 includes a satellite navigation system and a self-contained navigation system.

The vehicle sensors 26 include a vehicle speed sensor, an acceleration sensor, a yaw rate sensor, an inclination sensor, and the like, none of which are shown.

[1.2. Output System Device Group 16]

In the output system device group 16, there are included a driving force output device 40, a steering device 42, a braking device 44, and a notification device 46.

The driving force output device 40 includes a driving force ECU (Electronic Control Unit), and a drive source including an engine and/or a driving motor.

The driving force output device 40 generates a driving force in the host vehicle 10 in accordance with an operation of an accelerator pedal performed by the vehicle occupant, or a driving control instruction output from the vehicle control device 12.

The steering device 42 includes an electric power steering system (EPS) ECU and an EPS actuator. The steering device 42 generates a steering force in the host vehicle 10 in accordance with an operation of the steering wheel performed by the vehicle occupant, or a steering control instruction output from the vehicle control device 12.

The braking device 44 includes a brake ECU and a brake actuator. The braking device 44 generates a braking force in the host vehicle 10 in accordance with an operation of the brake pedal performed by the vehicle occupant, or a braking control instruction output from the vehicle control device 12.

The notification device 46 includes a notification ECU, and an information transmission device (a display device, an audio device, a haptic device, etc.). The notification device 46 issues a notification with respect to the vehicle occupant in accordance with a notification instruction output from the vehicle control device 12 or another ECU.

[1.3. Vehicle Control Device 12]

The vehicle control device 12 comprises an ECU, and includes a computation device 50 such as a processor, and a storage device 52 such as a ROM and a RAM. The vehicle control device 12 realizes various functions by the computation device 50 executing programs stored in the storage device 52.

As shown in FIG. 2, the computation device 50 functions as an external environment recognition unit 60, a host vehicle position recognition unit 70, an action planning unit 80, and a vehicle control unit 90.

On the basis of information output from the external environment sensors 18, the external environment recognition unit 60 recognizes the circumstances and objects in the vicinity of the host vehicle 10. The external environment recognition unit 60 includes a region recognition unit 62, a traffic participant recognition unit 64, and an external environmental state recognition unit 66.

Based on the image information from the cameras 28 and/or the high precision map 22, the region recognition unit 62 recognizes the existence, the type, the size, and the boundary position, etc., of the specified region {the railway crossing 140, an intersection, a drawbridge, or the like} positioned in respective directions (forward, leftward, and rightward) in relation to the direction of progress of the host vehicle 10.

Based on the image information from the cameras 28 and/or the detection information from the radar devices 30 and the LIDAR devices 32, the traffic participant recognition unit 64 recognizes a number of bicycles Nb and a number of people Np, respectively, of bicycles (bicycles on which people are riding) 20b and pedestrians 20p that are traffic participants 20 existing in the vicinity of the host vehicle 10.

Based on the image information from the cameras 28, the external environmental state recognition unit 66 recognizes the overall road environment, for example, the shape of the road, the road width, the positions of lane markings, the number of lanes, the lane width, the illuminated state of a traffic signal device, and the open or closed state of the crossing gate rods 132 of a railway crossing gate 130.

The shape of the road, the road width, the positions of the lane markings, the number of lanes, and the lane width may also be recognized using the high precision map 22.

Based on information output from the MPU 22 and the navigation device 24, the host vehicle position recognition unit 70 (also referred to simply as a position recognition unit) recognizes the travel position of the host vehicle 10 and the map information in the vicinity of the travel position.

The action planning unit 80 determines the traveling state of the host vehicle 10 on the basis of the recognition results of the external environment recognition unit 60 and the host vehicle position recognition unit 70, and formulates an action (generation of a trajectory or the like) for the host vehicle 10. The action planning unit 80 includes a vehicle situation determination unit 82, a standby time period setting unit 84, an entry permission determination unit 86, and an action setting unit 88.

On the basis of the recognition result of the external environment recognition unit 60 and the recognition result of the host vehicle position recognition unit 70, the vehicle situation determination unit 82 determines whether or not the host vehicle 10 is a leading vehicle that is waiting for the crossing gate rods 132 of the railway crossing gate 130 to open at the railway crossing 140.

On the basis of the recognition result of the external environment recognition unit 60 and the determination result of the vehicle situation determination unit 82, the standby time period setting unit 84 sets the standby time period T from opening of the crossing gate rods 132 of the railway crossing 140 until entry into the railway crossing 140 is started, in accordance with the number of the traffic participants 20 (the number Nb of the bicycles 20b and the number Np of the pedestrians 20p) existing in proximity to the railway crossing 140.

Figure 4:
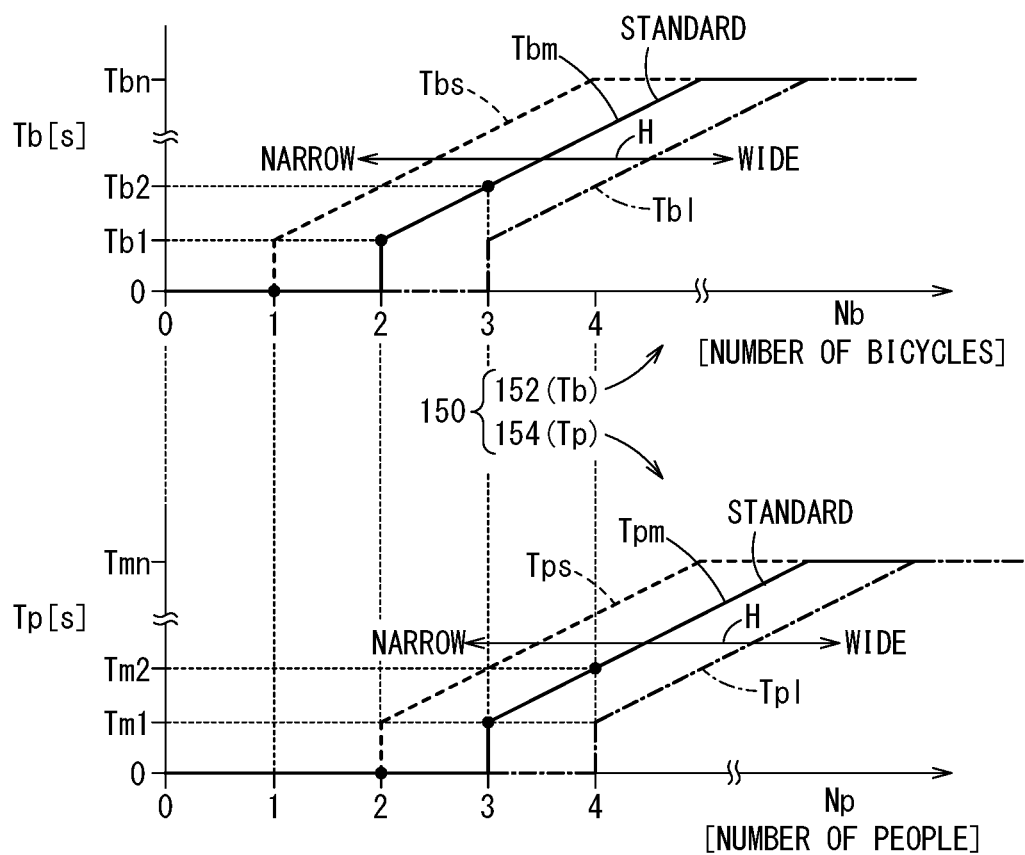
FIG. 4 is a characteristic diagram showing a map for the purpose of setting a standby time period for the host vehicle to wait after the railway crossing has opened.

The characteristic diagram shown in the upper part of FIG. 4 is a map (a standby time period map for the host vehicle 10 in relation to the number Nb of the bicycles 20b; therefore, also referred to as a bicycle standby time period map) 152, provided as an example of a bicycle standby time period Tb and showing a relationship between the standby time period Tb and the number Nb of the bicycles 20b. In the bicycle standby time period map 152, the characteristics are changed in accordance with a railway crossing length L and a railway crossing width (road width) H.

The characteristic diagram shown in the lower part of FIG. 4 is a map (a standby time period map for the host vehicle 10 in relation to the number Np of the pedestrians 20p; therefore, also referred to as a pedestrian standby time period map) 154 of a pedestrian standby time period Tp and showing a relationship between the standby time period Tp and the number Np of the pedestrians 20p. In the pedestrian standby time period map 154 as well, the characteristics are changed in accordance with the railway crossing length L and the railway crossing width H.

The bicycle standby time period map 152 and the pedestrian standby time period map 154 are collectively referred to as standby time period maps 150.

In the standby time period maps 150, the time period becomes shorter as the railway crossing width H (the road width Hv of a roadway 120+the pedestrian walkway width Hp of a pedestrian walkway 124) in the travel path (also referred to as a roadway) 120 of the host vehicle 10 becomes wider, and the time period becomes longer as the railway crossing width H becomes narrower. In the standby time period maps 150, in comparison with a standard standby time period Tbm (Tpm) drawn by the solid line, the standby time period Tbs (Tps) for the narrow case drawn by the dashed line is a longer time period, and the standby time period Tbl (Tpl) for the wide case drawn by the one-dot-dashed line is a shorter time period.

In the present embodiment, for example, with the standard standby time period Tbm in relation to the bicycles 20b, as shown by the dots, at two bicycles, the standby time period Tbm is set to Tb1, at one bicycle or less, the standby time period Tbm is set to zero seconds, and at three bicycles, the standby time period Tbm is set to Tb2 (Tb1<Tb2). Further, for example, with the standard standby time period Tpm in relation to the pedestrians 20p, as shown by the dots, at three people, the standby time period Tpm is set to Tm1, at two people or less, the standby time period Tpm is set to zero seconds, and at four people, the standby time period Tpm is set to Tm2 (Tm1<Tm2).

Moreover, the standby time period T may further be changed to a longer time period as the railway crossing length L becomes longer.

In the present embodiment, the standby time period setting unit 84 sets the standby time period T from opening of the crossing gate rods 132 of the railway crossing 140 until entry into the railway crossing 140 is started to the sum of the standby time period Tb obtained from the number Nb of the bicycles 20b and the standby time period Tp obtained from the number Np of the pedestrians 20p (T=Tb+Tp).

The entry permission determination unit 86 determines whether to permit the host vehicle 10 to enter into the railway crossing 140, on the basis of the standby time period T having elapsed, the open or closed state of the railway crossing 140, and the existence of the traffic participants 20 and the like.

The action setting unit 88 selects an action that the host vehicle 10 should take on the basis of the entry permission determination result of the entry permission determination unit 86. In this instance, a travel trajectory (target travel trajectory) and a vehicle speed (target vehicle speed) targeted by the host vehicle 10 when passing through the railway crossing 140 are set.

On the basis of the determination result of the action planning unit 80, the vehicle control unit 90 provides operating instructions to the output system device group 16.

The vehicle control unit 90 includes a driving control unit 92 and a notification control unit 94.

The driving control unit 92 generates control instructions in accordance with the target travel trajectory and the target vehicle speed formulated by the action planning unit 80, and outputs the control instructions to the driving force output device 40, the steering device 42, and the braking device 44.

The notification control unit 94 generates notification instructions with respect to the vehicle occupant, and outputs the notification instructions to the notification device 46.

2. Operations of Vehicle Control Device 12

Operations (process steps) of the vehicle control device 12 of the host vehicle 10 which is planning to cross over the railway crossing 140 will be described with reference to the flowchart of FIG. 5. The process steps are repeatedly executed while the electric power of the host vehicle 10 is turned on.

In step S1, in the external environment recognition unit 60, the region recognition unit 62 determines whether or not the railway crossing 140 exists on the travel path 120 of the host vehicle 10 on the basis of the most recent information output from the input system device group 14, and in the case that it exists (step S1: YES), the process transitions to step S2.

On the other hand, in the case that the railway crossing 140 does not exist (step S1: NO), the process temporarily comes to an end and waits for the next cycle.

In step S2, through the vehicle control unit 90, the action planning unit 80 causes the host vehicle 10 to stop at a stop line position 140*i* at the entrance of the railway crossing 140.

Next, in step S3, on the basis of the recognition results of the region recognition unit 62 and the external environmental state recognition unit 66, the vehicle situation determination unit 82 determines whether or not the railway crossing 140 is open from the situation of the railway crossing gate 130 and the position (rotational position) of the crossing gate rods 132.

In the case that the railway crossing 140 is closed (the crossing gate rods 132 are down) (step S3: YES), the process transitions to step S4.

In step S4, through the region recognition unit 62 and the external environmental state recognition unit 66, the vehicle situation determination unit 82 acquires the railway crossing width H (pedestrian walkway width Hp, road width Hv), and the railway crossing length L of the railway crossing 140, together with acquiring (detecting), by the external environmental state recognition unit 66 and the traffic participant recognition unit 64, the number Np of the pedestrians 20*p* and the number Nb of the bicycles 20*b* that are waiting for the railway crossing gate 130 of the railway crossing 140 to open.

Next, in step S5, the entry permission determination unit 86 determines, through the region recognition unit 62 and the external environmental state recognition unit 66, whether or not the railway crossing 140 has transitioned from a closed state to an open state. In the case of remaining in the closed state (step S5: NO), the most recent information (the number Np of the pedestrians 20*p* and the number Nb of the bicycles 20*b*) is acquired (detected) again in step S4. Moreover, in the second and subsequent instances of this process, there is no need to acquire the railway crossing width H and the like.

When the crossing gate rods 132 of the railway crossing 140 are opened, the determination in step S5 is affirmative (step S5: YES), and in step S6, the action planning unit 80 determines whether or not there are traffic participants 20 who have been waiting for the railway crossing 140 to open. In the case that such traffic participants 20 exist (step S6: YES), the process transitions to step S7 without the host vehicle 10 immediately entering into the roadway 120 inside the railway crossing 140.

In step S7, the standby time period setting unit 84 calculates the standby time period T with reference to the standby time period maps 150 shown in FIG. 4, and sets a non-illustrated timer (time counting unit), whereupon the entry permission determination unit 86 initiates down counting of the timer.

Moreover, in the present embodiment, assuming that the railway crossing width H is the standard width, and since the bicycles 20*b* are two in number (Nb=2) and the pedestrians 20*p* are three people (Np=3), with reference to the standard bicycle standby time period map Tbm and the standard pedestrian standby time period map Tpm, the standby time period T is set to T=Tb1+Tm1.

Next, in step S8, the entry permission determination unit 86 determines whether or not the counting of the timer has ended, and when the standby time period T has elapsed, then in step S9, the entry permission determination unit 86 determines whether or not the railway crossing 140 is maintained in the open state.

In the case that the open state is maintained (step S9: YES), the process transitions to step S10, whereas in the case that the crossing gate rods 132 of the railway crossing 140 are starting to descend or the like, and the open state is not maintained (step S9: NO), transitioning of the process to step S4 is repeated.

On the other hand, in the case that the railway crossing 140 is maintained in the open state, in step S10, the entry permission determination unit 86 further confirms that the traffic participants 20 do not exist within the roadway 120, and in the case that the traffic participants 20 are no longer present within the roadway 120 (step S10: YES), then in step S11, a determination is made that entry into the railway crossing 140 is possible.

Consequently, the action setting unit 88 drives the output system device group 16 through the vehicle control unit 90, and executes an approach and pass through operation (crossing operation) of the host vehicle 10 through the railway crossing 140, whereby the host vehicle 10 is permitted to travel on the roadway 120 and pass through the railway crossing exit 140*o*.

Moreover, in the determination of step S3, in the case that the railway crossing 140 is open (step S3: NO), then in step S10, the determination is made as to whether the traffic participants 20 do not exist within the roadway 120 inside the railway crossing 140, and the above-described process is executed in accordance with the determination result.

Further, in the determination of step S6, in the case that there are no traffic participants 20 (step S6: NO), without setting the standby time period T, the action planning unit 80 immediately executes the entry and approach operation (crossing operation) of step S11.

3. Summary of Present Embodiment

The vehicle control device 12 is equipped with the external environment recognition unit 60 that recognizes the traffic participants 20 and the railway crossing 140 existing in the vicinity of the host vehicle 10, the host vehicle position recognition unit (position recognition unit) 70 that recognizes the travel position of the host vehicle 10, the vehicle situation determination unit 82 that determines whether or not the host vehicle 10 is planning to pass through the railway crossing 140 on the basis of the recognition result of the external environment recognition unit 60 and/or the recognition result of the position recognition unit 70, the standby time period setting unit 84 that sets the standby time period T until entry into the railway crossing 140 is started, in accordance with the type or the number of the traffic participants 20 existing in proximity to the railway crossing 140, and the entry permission determination unit 86 that restrains entry of the host vehicle 10 into the railway crossing 140 (entry not permitted) until the standby time period T elapses from the time at which the railway crossing 140 has transitioned from a traffic blocking state to a traffic permissible state (step S5: YES), and permits entry of the host vehicle 10 into the railway crossing 140 at a time when the standby time period T has elapsed.

In accordance with such a configuration, until the standby time period T, which is set in accordance with the number of the traffic participants 20 existing in proximity to the railway crossing 140, has elapsed from the time at which the railway crossing 140 has transitioned from the traffic blocking state to the traffic permissible state, entry of the host vehicle 10 into the railway crossing 140 is restrained, and at a time when the standby time period T has elapsed, the host vehicle 10 is permitted to enter into the railway crossing 140.

Therefore, in the case that the host vehicle 10 is an automatically driven vehicle, the host vehicle 10 can be allowed to enter into the railway crossing 140 when the standby time period T has elapsed, and in the case that the host vehicle 10 is a driving assisted vehicle, a warning is issued through the notification control unit 94 and the notification device 46 when the host vehicle 10 attempts to enter into the railway crossing 140 before the standby time period T elapses, and when the standby time period T has elapsed, the host vehicle 10 can be prompted through the notification device 46 to enter into the railway crossing 140.

In this case, by the standby time period setting unit 84 setting the standby time period T to be longer as the number of the traffic participants 20 (number of people Np+number of bicycles Nb) becomes greater, the standby time period T can be set to an appropriate time period.

Moreover, in the standby time period setting unit 84, since the standby time period T is set so as to change in accordance with the type of the traffic participants 20, and specifically, whether they are the pedestrians 20p and/or the bicycles 20b, the standby time period T can be set more appropriately.

Further, the standby time period setting unit 84 sets the standby time period T to be longer as the railway crossing width H inside the railway crossing 140 becomes narrower. As the railway crossing width H becomes narrower, the passage time period (crossing time period) of the traffic participants 20 inside the railway crossing 140 becomes longer. Therefore, by lengthening the standby time period T corresponding to the passage time period, an appropriate standby time period T for the host vehicle 10 can be set.

The vehicle control device according to the present invention is not limited to the above-described embodiment, and it goes without saying that various additional or alternative configurations could be adopted therein without departing from the essence and gist of the present invention. For example, in the case that the host vehicle 10 is not the leading vehicle in a group of vehicles waiting for the railway crossing 140 to open, in the standby time period that is set in consideration of the traffic participants 20, it may further be considered to set the standby time period T to a standby time period until the vehicles from the leading vehicle to a preceding vehicle can cross over the railway crossing 140.

The invention claimed is:

1. A vehicle control device comprising one or more processors that execute computer-executable instructions stored in a memory, wherein the one or more processors execute the computer-executable instructions to cause the vehicle control device to perform a driving control for a host vehicle, the vehicle control device comprising:
    an external environment recognition unit configured to recognize traffic participants and a railway crossing with a railway crossing gate existing in a vicinity of the host vehicle;
    a position recognition unit configured to recognize a travel position of the host vehicle;
    a vehicle situation determination unit configured to determine whether or not the host vehicle is planning to pass through the railway crossing on a basis of a recognition result of the external environment recognition and/or a result obtained by the position recognition unit;
    a determining unit configured to determine whether the traffic participants are waiting for the railway crossing gate of the railway crossing to open for crossing over the railway crossing on a basis of a recognition result of the external environment recognition unit; and
    a standby time period setting unit configured to set a standby time period until entry of the host vehicle into the railway crossing is started on a basis of the determination result of the determining unit,
    wherein the one or more processors cause the vehicle control device to restrain entry of the host vehicle into the railway crossing until the standby time period elapses from a time at which the railway crossing has transitioned from a traffic blocking state to a traffic permissible state, and permit entry of the host vehicle into the railway crossing at a time when the standby time period has elapsed.

2. The vehicle control device according to claim 1, wherein the one or more processors cause the vehicle control device to set the standby time period to be longer as the number of the traffic participants becomes greater.

3. The vehicle control device according to claim 1, wherein the one or more processors cause the vehicle control device to set the standby time period to be longer as a road width inside the railway crossing becomes narrower.

4. The vehicle control device according to claim 2, wherein the one or more processors cause the vehicle control device to set the standby time period to a sum of a predetermined standby time period obtained from a number of pedestrians and a predetermined standby time period obtained from a number of bicycles.

* * * * *